United States Patent [19]

Itoh

[11] 4,093,296

[45] June 6, 1978

[54] BOTTLE GRIPPER

[75] Inventor: Tsutomu Itoh, Tokyo, Japan

[73] Assignee: Onoda Cement Co., Ltd., Onoda, Japan

[21] Appl. No.: 808,060

[22] Filed: Jun. 20, 1977

[30] Foreign Application Priority Data

Jun. 28, 1976  Japan .................................. 51-75469

[51] Int. Cl.² .............................................. B66C 1/42
[52] U.S. Cl. ..................................... 294/90; 294/115; 294/116
[58] Field of Search ................... 294/86 R, 87.22, 90, 294/99 R, 100, 106, 115, 116; 198/653–655, 694–696; 214/1 BA; 279/37, 38

[56] References Cited

U.S. PATENT DOCUMENTS

| | | | |
|---|---|---|---|
| 2,899,232 | 8/1959 | Walter | 294/116 X |
| 2,929,653 | 3/1960 | Hund et al. | 294/90 X |
| 3,178,217 | 4/1965 | Bargel | 294/90 X |
| 3,856,343 | 12/1974 | Muller | 294/90 X |
| 3,863,753 | 2/1975 | Shank | 294/90 X |
| 3,944,058 | 3/1976 | Strauss | 294/115 X |

Primary Examiner—Johnny D. Cherry
Attorney, Agent, or Firm—Price, Heneveld, Huizenga & Cooper

[57] ABSTRACT

A bottle gripper for handling a bottle when depositing powder paint on the bottle in an electrostatic powder coating process and the like, the gripper comprises a cylindrical arm in which a shaft is inserted coaxially for relative movement in an axial direction. Several swingable pieces are attached to and are linked between the arm's lower end and the lower portion of each of the pieces, which forms a short thin cylindrical shell when gripping a bottle and is wrapped in a hat-shaped cover made of resilient material such as rubber with the outer rim of the resilient cover being fixed to the lower end of the arm in order to protect against entry of powder particles into the swing mechanism. The resilient cover is closed or opened by the relative movement between the arm and the shaft when gripping or releasing the head of a bottle.

19 Claims, 10 Drawing Figures

U.S. Patent   June 6, 1978   Sheet 2 of 3   4,093,296
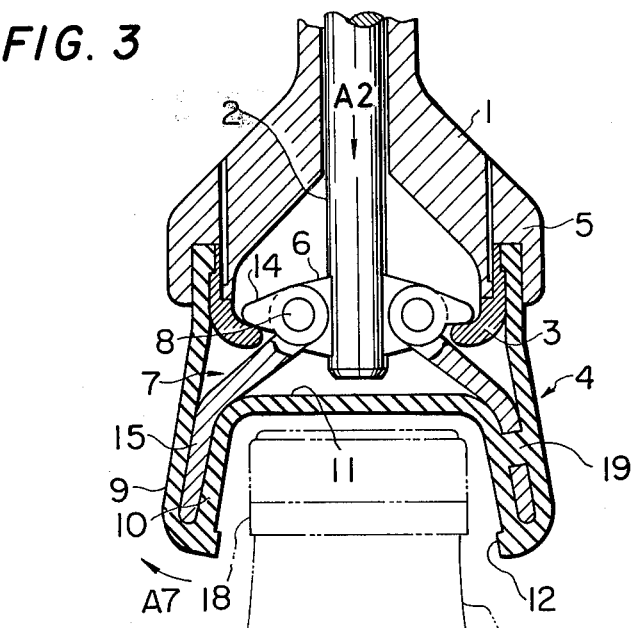
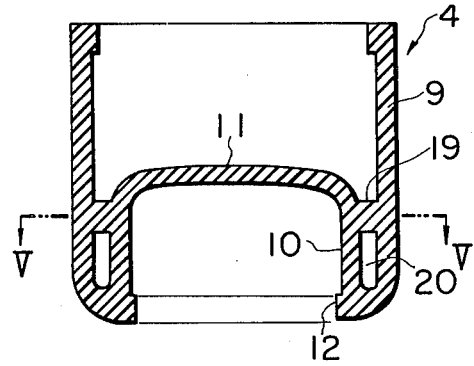
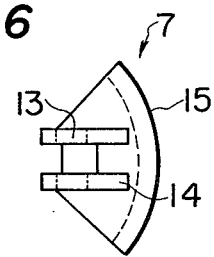
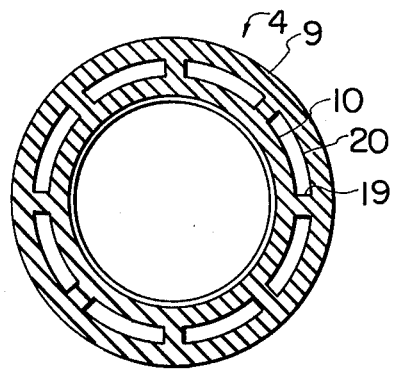
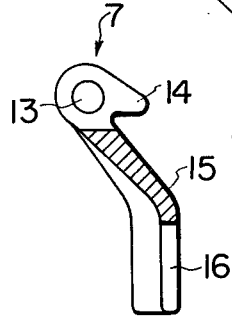

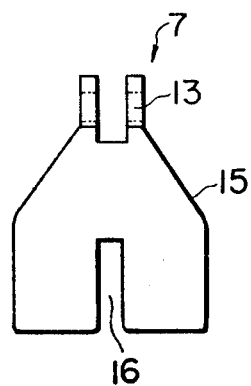
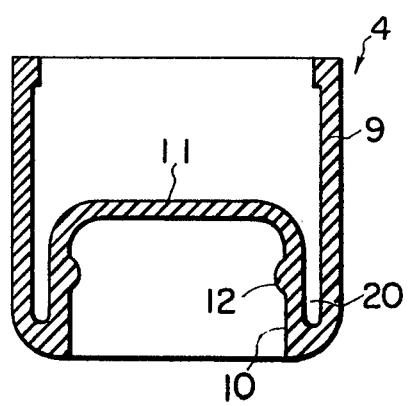
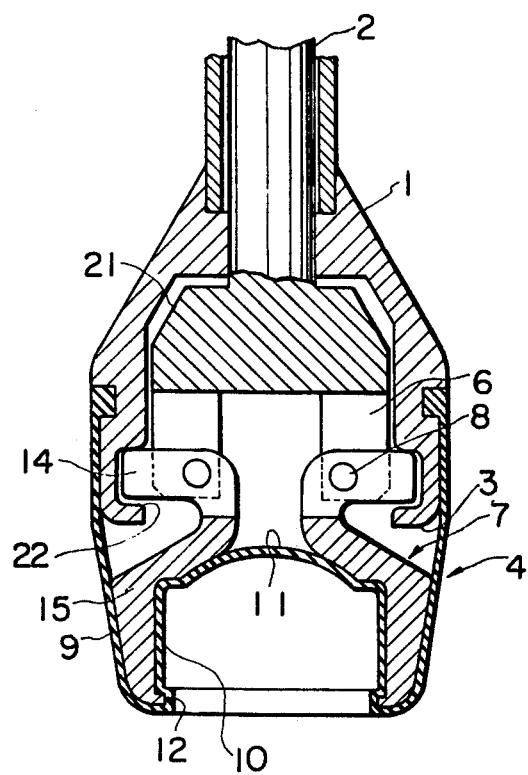

BOTTLE GRIPPER

This invention relates to a bottle gripper to be used to grip the head of a bottle when the bottle is being electrostatically coated with powder.

It often happens that glass bottles of soft drinks such as cola, cider, and others such as beer, are broken by pressure inside the bottle caused by sunshine. To avoid this, the outer surface of the bottle is covered with a synthetic resin. One proposed method of achieving this is to make an electrostatic coating with a synthetic resin powder over the outer surface of the bottle and then to apply heat to form a solid film. For this use, some new resin powders have been produced. However, in the process of powder coating the bottle, there arises a serious problem because there is difficulty in containing with a cap the substance in the bottle if any synthetic resin powder, even a trivial amount, attaches to the head of the bottle. It is absolutely necessary in powder coating to obtain means for avoiding attachment of resin particles to the head of the bottle.

Also, it is required to form a clearly defined coating boundary at the upper end of the coated film formed on the bottle head to give the film longer life and to maintain the commercial value of the bottle.

To achieve the aforementioned requirements, some apparatus for avoiding the attachment of resin powder particles to the head of the bottle have been proposed with means for blowing or suctioning gas or a combination of these. However to insure a long period of operation and to form a clear boundary, further development of new reliable means is urgently desired.

One object of the present invention is to solve the above problems and to furnish a gripper for bottles that is capable of completely avoiding the attachment of resin to the bottle head while holding it firmly in the process of resin coating and establishing the formation of a clear boundary at the upper end of the coating.

Another object of the present invention is to furnish a bottle gripper that ensures against penetration of powder thereinto.

A further object of the present invention is to furnish a bottle gripper that enables easy removal of resin particles from the gripper after electrostatic coating has been finished.

The bottle gripper of the present invention is constructed using a cylindrically shaped arm, an inwardly projecting supporter and a resilient cap. Such a cap is formed of an outer cylinder and an inner cylinder extending from the lower end of the outer cylinder providing a gap therebetween and a flat wall formed on the top of the inner cylinder. A shaft is inserted with a loose fit in the center of said cylindrically shaped arm. From the lower end of this shaft plural branch plates extend to which swingable pieces are mounted for engagement by said supporter. Skirt portions of the swingable pieces are inserted in the gap formed between said outer cylinder and inner cylinder.

Other features and objects of the invention will be better understood from the following detailed description of the typical embodiment illustrated in the accompanying drawings in which:

FIG. 3 is a front view of a cross section of the bottle gripper of the present invention when the resilient cap is opened.

FIG. 4 is a front view of a cross section of the resilient cap of the present invention.

FIG. 5 is a cross section view taken along the line V—V in FIG. 4.

FIG. 6 is a plan view of a swingable piece of the present invention.

FIG. 7 is a front view of a cross section of the swingable piece.

FIG. 8 is a side view of the swingable piece.

FIG. 9 is a front view of a cross section of a resilient cap of another embodiment.

FIG. 10 is a front view of a cross section of another embodiment of the present invention.

Now reference is made to accompanying drawings.

Figure 1:
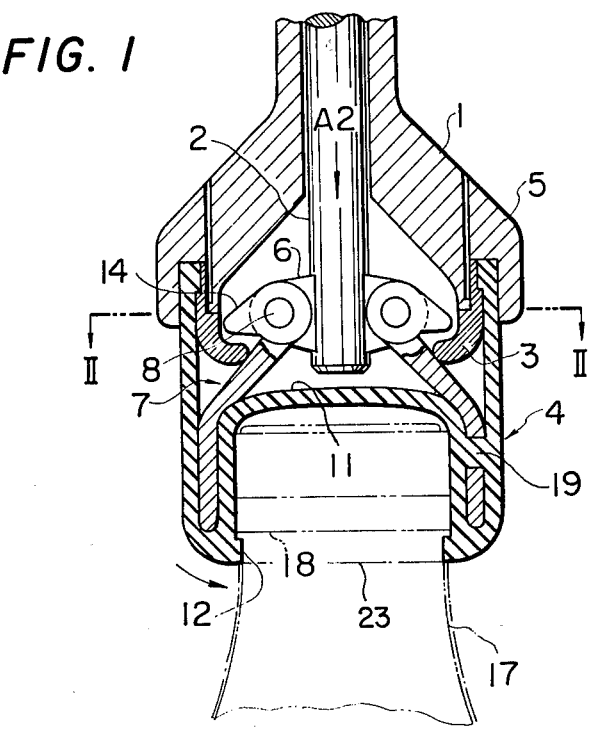
FIG. 1 is a front view of a cross section of a bottle gripper of the present invention when its resilient cap is closed.
Figure 2:
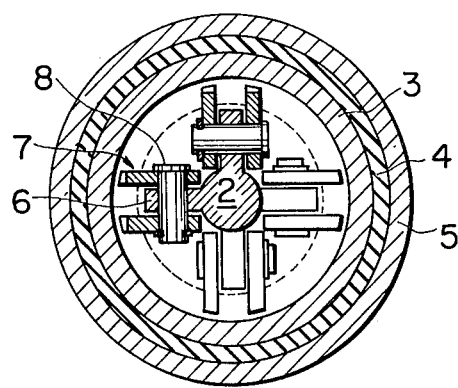
FIG. 2 is a cross section view taken along the line II—II in FIG. 1.

In FIGS. 1 and 2, numeral 1 designates a cylindrical arm in which a shaft 2 is inserted with a loose fit. At the lower portion of the cylindrical arm 1, the upper part of a supporter 3 is screwed with its lower end projecting inwardly. Further, at the lower portion of cylindrical arm 1, a resilient cap 4 is engaged and secured with screw by an outside holder ring 5. Also the lower portion of the shaft 2 has branch plates to which the heads of a plurality of swingable pieces 7 are attached with pins 8.

As seen in FIGS. 4, 5 and 9, resilient cap 4 is formed of a pair of cylindrical walls including an outer cylinder 9 and inner cylinder 10 extending integrally from the lower end of outer cylinder 9 with a plurality of connections 19 between the upper end of inner cylinder 10 and outer cylinder 9 so that a generally annular gap 20 is formed between these cylinders. An upper flat wall 11 is formed at the upper end of the inner cylinder 10 and an annular ridge 12 is formed at the inner periphery of the lower end of the inner cylinder 10. If necessary, such ridge 12 is provided at the middle part of the inner wall of the cylinder 10.

As shown in FIGS. 6-8, each swingable piece 7 has at its upper end pin holes 13 to receive pin 8 and a projection 14 to be engaged with said supporter 3. The lower portion of the swingable piece 7 forms a skirt 15 dividing the circumference into four equal sections. However, the skirt is not always required to be sized as just one fourth of the circumference. A groove 16 is formed in this skirt 15 to receive said connection 19 as necessitated.

Operation of this bottle gripper is as follows. In FIG. 3, first, skirt 15 of swingable piece 7 is inserted in the gap between outer cylinder 9 and inner cylinder 10 of cap 4. Then the upper portion of cylindrical arm 1 is connected to a chain or conveyor (not shown) and advanced in one direction. As shaft 2 is pushed in the direction of arrow A2 by turning of a cam plate or screw (not shown), projection 14 of swingable piece 7 is supported by supporter 3 and swingable piece 7 is turned with pin 8 as its center in the direction of arrow A7 to open wide the lower portion of resilient cap 4 (FIG. 3).

When the head of a bottle 17 enters inside of resilient cap 4, shaft 2 is pushed by the cam plate in the direction reverse to arrow A2 as in FIG. 1 whereby projection 14 is disengaged from supporter 3, swingable pieces 7 are pressed by supporter 3, and resilient cap 4 comes to grip the head of bottle 17 with its spring action. In this instance, ridge portion 12 of cap 4 engages the portion just below a rib 18 of the bottle head 17 to securely grip it whereby powder and any other matter can not enter inside the gripper.

While bottle 17 is securely gripped by resilient cap 4 as shown in FIG. 1, electrostatic coating of resin powder may be made on the surface of bottle 17. As described before, when the painting or coating is over, shaft 2 is pushed to the direction of arrow A2 to the state as shown in FIG. 3, thus there is formed a clear boundary line 23 at the upper end of powder layer and cap 4 can be removed from the bottle 17.

In the present invention, with only upward or downward movement of shaft 2, resilient cap 4 can easily grip the head of the bottle 17 very securely. Since the bottle head is covered by cap 4, any powder particle does not attach to the head of the bottle. Even when the bottle is not yet gripped by the gripper with a number of chains connected thereto, powder particles will not deposit on the swingable pieces as such swingable pieces 7 are completely enclosed by outer cylinder 9, inner cylinder 10 and upper flat wall 11. Therefore there will not occur any trouble caused by clogging of resin powder.

Another embodiment is illustrated in FIG. 10. Therein at the lower end of a cylindrical arm 1, a supporter 3 is integrally formed and at the outer periphery of the supporter 3, a resilient cap 4 is engagedly mounted. A cylinder 21 is attached to the lower end of a shaft 2. Branch plates 6 project downwardly from the cylinder 21 to which swingable pieces 7 are pivotally attached with pins 8. Projections 14 of the swingable pieces 7 are to be engaged in a recess 22 of the supporter 3. Other components of this embodiment are the same as those in the embodiment in FIG. 1.

What is claimed is:

1. A bottle gripper comprising a cylindrically shaped arm in the center of which a shaft is inserted with a loose fit, at the lower portion of the arm there being an inwardly projecting supporter, and a resilient cap formed of an outer cylinder, an inner cylinder extending therefrom to form a gap therebetween and a flat upper wall formed at the top of the inner cylinder, said shaft having branch plates at its lower end to which a plurality of swingable pieces are attached, each swingable piece having a projection at its upper end to be supported on said supporter and a skirt portion to be received in the gap between the outer and inner cylinders.

2. A bottle gripper as claimed in claim 1 in which the inwardly projecting supporter is coupled to the outer periphery of the lower portion of said cylindrically shaped arm, and the outer periphery of said supporter is engaged by the outer cylinder of the resilient cap.

3. A bottle gripper as claimed in claim 1 in which an annular ridge for tightening around the bottle is coupled to the inner periphery of the lower end of the inner cylinder of the resilient cap.

4. A bottle gripper as claimed in claim 1 in which an annular ridge for tightening around the bottle is coupled to the middle of the inner wall of the inner cylinder.

5. A bottle gripper comprising:
a cylindrically shaped arm and a relatively longitudinally movable shaft passing within said arm;
a supporter coupled to the bottom portion of said arm and having an inwardly extending portion;
a resilient cap having at least one portion of a generally annular gap between a generally cylindrical inner wall and a generally cylindrical outer wall; and
a swingable piece pivotally coupled to the bottom portion of said arm, said swingable piece including skirt portion to be received in said annular gap and a projection to engage said supporter so that moving said shaft relative to said arm in a first direction causes said projection to engage said supporter and causes said skirt to pivot thus opening said resilient cap to receive a bottle and moving said shaft relative to said arm in a second direction, opposite from said first direction, causes said skirt to pivot inwardly and said resilient cap to grip the bottle.

6. A bottle gripper as recited in claim 5 further comprising:
an upper wall extending across the top of said generally cylindrical inner wall thereby partially defining an opening for receiving the bottle and shielding said swingable piece from contamination such as a resin powder.

7. A bottle gripper as recited in claim 5 wherein said shaft includes branch plates extending from a lower portion of said shaft for pivotally coupling said swingable plate to said shaft.

8. A bottle gripper as recited in claim 7 wherein there are four branch plates and four swingable pieces arranged circumferentially around said shaft having generally equal spacing therebetween.

9. A bottle gripper as recited in claim 5 wherein said arm and said supporter are integral.

10. A bottle gripper as recited in claim 5 wherein said supporter is coupled to said arm by a screw engagement between said supporter and said arm.

11. A bottle gripper as recited in claim 10 further comprising:
an outside holder ring for coupling said resilient cap to said arm, said holder ring supporting the outer cylindrical wall between said holder ring and said arm.

12. A bottle gripper for handling a bottle when depositing a powder paint on the bottle, said bottle gripper comprising:
a cylindrically shaped arm and a relatively movable shaft passing longitudinally and coaxially within said arm;
a supporter coupled by screw engagement to the bottom portion of said arm and having an inwardly extending portion;
a resilient cap having a generally annular gap between a generally cylindrical inner wall and a generally cylindrical outer wall, an upper wall extending across the top of said generally cylindrical inner wall thereby partially defining an opening for receiving the bottle, reinforcing members extending across said gap between said inner and outer walls, and an annular ridge for tightening said cap on the bottle extending inwardly from the lower end of the inner wall;
four branch plates extending outwardly from said shaft, each of said branch plates having an opening for receiving a pivot pin;
four swingable pieces, one swingable piece pivotally coupled to each of said branch plates, each swingable piece including a skirt portion to be received in said annular gap and a projection to engage said supporter so that moving said shaft relative to said arm in a first direction causes said projection to engage said supporter and causes said skirt to pivot thus opening said resilient cap to receive the bottle and moving said shaft relative to said arm in a second direction, opposite from said first direction, causes said skirt to pivot inwardly and said resilient cap to grip the bottle; and an outside holder ring for coupling said resilient cap to said arm, said holder ring supporting said outer cylindrical wall between said holder ring and said arm thereby protecting against the entry of powder particles into the pivotal coupling between said branch plates and swingable pieces.

13. A bottle gripper for handling a bottle when depositing a powder paint on the bottle, said bottle gripper comprising:

a cylindrically shaped arm and a relatively movable shaft passing longitudinally and coaxially within said arm, said arm including an integral supporter extending inwardly from the bottom portion of said arm and an outwardly facing circumferential groove;

a resilient cap having a generally annular gap between a generally cylindrical inner wall and a generally cylindrical outer wall, an upper wall extending across the top of said generally cylindrical inner wall thereby partially defining an opening for receiving the bottle, an annular ridge for tightening said cap on the bottle extending inwardly from the inner wall, and an annular protrusion extending inwardly from the inside surface of said outer wall to be received within said circumferential groove thereby securing said cap to said arm;

four branch plates extending outwardly from said shaft, each of said branch plates having an opening for receiving a pivot pin; and four swingable pieces, one swingable piece pivotally coupled to each of said branch plates, each swingable piece including a skirt portion to be received in said annular gap and a projection to engage said supporter so that moving said shaft relative to said arm in a first direction causes said projection to engage said supporter and causes said skirt to pivot thus opening said resilient cap to receive the bottle and moving said shaft relative to said arm in a second direction, opposite from said first direction, causes said skirt to pivot inwardly and said resilient cap to grip the bottle.

14. A device for holding a bottle during formation of a plastic coating on its exterior surface, said device comprising:

a hollow arm and an actuator element reciprocally movable therethrough, a cup-shaped cap of flexible material mounted on and depending from said arm, said cap having a depending annular flange surrounding a blind recess opening through the lower end of said cap, a plurality of means extending into said flange pivotally secured to said actuator element for convergent and divergent movement as said actuator element is moved in opposite directions, the flange being adapted to seat over the end of a bottle and to clamp thereabout to seal it from deposit of dust-like particles when said means are caused to converge.

15. The device described in claim 14 wherein the lower end of said flange has a radially inwardly directed bottle gripping ridge at the mouth of said blind recess.

16. The device described in claim 14 wherein said means are arranged in a circular pattern; a shoulder on each of said means engaging a fixed shoulder on said arm for causing said means to pivot when said actuator element is moved axially.

17. The device described in claim 14 wherein said flange has a plurality of blind pockets, one of said means seated in each of said pockets.

18. The device described in claim 17 wherein said means has a widened skirt portion at its lower end.

19. The device described in claim 18 wherein the lower end of said skirt portion is inturned to form a bottle engaging and sealing ridge at the mouth of said blind recess in said cap.

* * * * *